(12) United States Patent
Che et al.

(10) Patent No.: US 9,678,806 B2
(45) Date of Patent: Jun. 13, 2017

(54) METHOD AND APPARATUS FOR DISTRIBUTING PROCESSING CORE WORKLOADS AMONG PROCESSING CORES

(71) Applicant: Advanced Micro Devices, Sunnyvale, CA (US)

(72) Inventors: Shuai Che, Bellevue, WA (US); Bradford Beckmann, Redmond, WA (US); Marc S. Orr, Newcastle, WA (US); Ayse Yilmazer, Istanbul (TR)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/751,311

(22) Filed: Jun. 26, 2015

(65) Prior Publication Data
US 2016/0378565 A1    Dec. 29, 2016

(51) Int. Cl.
*G06F 9/50* (2006.01)
*G06F 9/38* (2006.01)
*G06F 9/30* (2006.01)

(52) U.S. Cl.
CPC ........ *G06F 9/5083* (2013.01); *G06F 9/30047* (2013.01); *G06F 9/3887* (2013.01); *G06F 9/505* (2013.01)

(58) Field of Classification Search
None
See application file for complete search history.

(56) References Cited

U.S. PATENT DOCUMENTS

| | | | | |
|---|---|---|---|---|
| 6,651,082 B1* | 11/2003 | Kawase | ................ | G06F 9/5083 718/105 |
| 6,993,762 B1* | 1/2006 | Pierre | .................... | G06F 9/5083 718/100 |
| 8,230,434 B2* | 7/2012 | Armstrong | ............ | G06F 9/5077 713/1 |
| 9,038,088 B2* | 5/2015 | Phull | ..................... | G06F 9/5083 713/375 |
| 9,485,310 B1* | 11/2016 | Bono | ................ | G06F 17/30197 |

(Continued)

OTHER PUBLICATIONS

Acar et al., Scheduling Parallel Programs by Work Stealing with Private Dequeus, 2013, ACM, PPoPP'13, pp. 219-228.*

(Continued)

*Primary Examiner* — Abu Ghaffari
(74) *Attorney, Agent, or Firm* — Faegre Baker Daniels LLP (57) ABSTRACT

Briefly, methods and apparatus to rebalance workloads among processing cores utilizing a hybrid work donation and work stealing technique are disclosed that improve workload imbalances within processing devices such as, for example, GPUs. In one example, the methods and apparatus allow for workload distribution between a first processing core and a second processing core by providing queue elements from one or more workgroup queues associated with workgroups executing on the first processing core to a first donation queue that may also be associated with the workgroups executing on the first processing core. The method and apparatus also determine if a queue level of the first donation queue is beyond a threshold, and if so, steal one or more queue elements from a second donation queue associated with workgroups executing on the second processing core.

17 Claims, 6 Drawing Sheets

(56) References Cited

U.S. PATENT DOCUMENTS

| | | | | |
|---|---|---|---|---|
| 2005/0210472 | A1* | 9/2005 | Accapadi | G06F 9/505 718/105 |
| 2010/0262975 | A1* | 10/2010 | Reysa | G06F 9/5077 718/105 |
| 2011/0055839 | A1* | 3/2011 | Alexander | G06F 9/5066 718/102 |
| 2012/0192201 | A1* | 7/2012 | Sander | G06T 1/20 718/105 |
| 2013/0081044 | A1* | 3/2013 | Sandstrom | G06F 15/80 718/104 |
| 2016/0154677 | A1* | 6/2016 | Barik | G06F 9/505 718/105 |

OTHER PUBLICATIONS

Chen et al., DWS: Demand-aware Work-Stealing in Multi-programmer Multi-core Architectures, 2014, ACM, PMAM'14, pp. 1-9.*

Lifflander et al., Work Stealing and Persistence-based Load Balancers for Iterative Overdecomposed Applications, 2012, ACM, HPDC'12, pp. 137-148.*

Navarro et al., Load Balancing Using Work-Stealing for Pipeline Parallelism in Emerging Applicaitons, 2009, ICS'09, pp. 517-518.*

Peng et al., Towards Efficient Work-Stealing in Virtualized Environments, 2015, IEEE, 15th IEEE/ACM International Symposium on Cluster, Cloud and grid Computing, pp. 41-50.*

Phothilimthana et al., Portable Performance on Hetrogenous Architecture, 2013, ACM, ASPLOS'13, pp. 431-444.*

Tripathy et al., Dynamic Load Balancing with "Work Stealing" for Distributed Shared Memory Clusters, 2010, IEEE, 2010 International Conference on Industrial Electronics, Control and Robotics, pp. 43-47.*

Tzeng et al., "Task Management for Irregular-Parallel Workloads on the GPU," High Performance Graphics, Saarbruecken, Germany, Jun. 25-27, 2010.

Chatterjee et al., "Dynamic Task Parallelism with a GPU Work-Stealing Runtime System," Languages and Compilers for Parallel Computing, 24th International Workshop, LCPC 2011, Fort Collins, CO, USA, Sep. 8-10, 2011. Revised Selected Papers, pp. 203-217, 2013.

Nasre et al., "Data-driven versus Topology-driven Irregular Computations on GPUs," 27th IEEE International Parallel & Distributed Processing Symposium, pp. 463-474, May 2013.

Cederman et al., "Dynamic Load Balancing Using Work-Stealing," GPU Computing Gems Jade Edition, 2011.

Liu et al., "Efficient Sparse Matrix-Vector Multiplication on x86-Based Many-Core Processors," Proceedings of the 27th International ACM Conference on International Conference on Supercomputing, pp. 273-282, 2013.

Orr et al., "Synchronization Using Remote-Scope Promotion," International Conference on Architectural Support for Programming Languages and Operating Systems (ASPLOS); Mar. 2014.

* cited by examiner

METHOD AND APPARATUS FOR DISTRIBUTING PROCESSING CORE WORKLOADS AMONG PROCESSING CORES

BACKGROUND OF THE DISCLOSURE

The disclosure relates generally to methods and apparatus for regulating load imbalances among processing cores, such as processing cores within a Graphics Processing Unit (GPU), Central Processing Unit (CPU), or other processing cores. In general, processing workloads (e.g. one or more software threads needing to be executed) processed by processing devices, such as GPUs, may present load imbalance, whereby a first processing core may be busy executing assigned software threads (e.g. sequences of programmed instructions) while a second processing core may be idle. In such a situation, the overall processing power of the processing device(s) is not fully utilized, as the second processing core is not processing available work (e.g. software threads that may be waiting to be executed by the first processing core). Furthermore, software threads to be executed on the first processing core may need to wait for one or more other software threads that are or will be executing on the first processing core to complete before being executed on the first processing core. Accordingly, shorter running software threads may have to wait for longer running software threads to complete before being executed on the first processing core, instead of utilizing the computational resources and power available on the second processing core. Thus, to achieve higher levels of a processing device's performance, such as within a GPU, it is desirable to distribute processing work among various processing cores efficiently such that no processing core is idle (e.g. not executing instructions) while another core has a backlog of work to be processed.

Current solutions provide dynamic ways of rebalancing processing workloads to achieve higher levels of GPU performance. For example, the work donation method attempts to improve workload imbalances among execution units, such as Single Instruction Multiple Data (SIMD) units, within a processing core (e.g. intra-core). The execution units typically execute in lockstep, where each one is associated with one or more workgroups. A workgroup includes one or more wavefronts, whereby a wavefront is a collection of software threads that execute on the same execution unit in lockstep. A workgroup may include multiple wavefronts associated with different execution units, such that wavefront software threads from one wavefront execute on one execution unit, and wavefront software threads from another wavefront execute on another execution unit within the same processing core.

The work donation process allows a workgroup associated with a particular processing core to donate unprocessed workloads (e.g. a software thread waiting or needing to be executed) to another workgroup associated with the same processing core, such that unprocessed workloads may be transferred from one execution unit to another. For example, workgroups may hold unprocessed workloads in the form of workgroup queue elements (e.g. pointers to instructions and tasks needing to be executed) within workgroup queues. To donate workgroup queue elements from one workgroup queue to another, a donation queue may be used such that workgroup queue elements are donated from one workgroup queue to the donation queue. Another workgroup queue may then obtain those donated queue elements from the donation queue, resulting in a transfer of unprocessed workloads from one workgroup queue to another. As such, the work donation process attempts to alleviate load imbalances among the various execution units within a processing core using workgroup queues.

To carry out the work donation process, operations such as reads and writes to memory may be required, for example, when implementing workgroup queues in memory. These operations may be performed within a processing core scope, i.e., where reads and writes to memory accessible to software threads executing on a particular core are synchronized among those software threads. For example, workgroup queues associated with a particular processing core may be available in memory, such as L1 cache memory, that is accessible to software threads executing on a particular processing core, but not to software threads executing on other processing cores. As an example, the L1 cache memory may store, or contain the latest state of, the workgroup queues associated with a particular processing core. As such, to maintain data integrity, reads and writes to the same area of L1 cache memory must be synchronized across all software threads executing on a particular core of a processing device accessing the same data in the L1 cache memory.

A different process, work stealing, attempts to improve workload imbalances among different processing cores of a particular device by providing for the stealing of donation queue elements from one donation queue associated with one processing core to another donation queue associated with a different processing core. For example, a processing device may include multiple processing cores, where each processing core may have one or more donation queues associated with workgroups executing on that particular processing core (e.g. software threads executing on that processing core). The processing cores are able to submit queue elements to, and obtain queue elements from, their respective donation queues. As such, the work stealing mechanism allows for the transfer of unprocessed workloads from a donation queue associated with a workgroup executing on one processing core to a donation queue associated with a workgroup executing on a different processing core of the processing device. Thus, each processing core may steal (e.g. obtain) unprocessed workloads from the other.

To carry out the work stealing process, operations such as reads and writes to memory may be required, for example, when implementing donation queues in memory. These operations are typically performed within a device scope, i.e., where reads and writes to memory accessible to various software threads executing on different cores on the same device are synchronized among those software threads. For example, donation queues associated with a particular processing core may be stored in memory, such as L2 cache memory, that is accessible to software threads executing on various processing cores of a processing device. As such, to maintain data integrity, reads and writes to the same area of L2 cache memory must be synchronized across all software threads executing on all cores of the processing device that may access the same data in the L2 cache memory.

These methods of rebalancing unprocessed workloads, however, suffer inefficiencies that prevent optimal processing device performance. For example, in high software thread count situations, work donation systems suffer from high software thread contention to data stored in local data storage, such as data stored in L1 cache memory that is accessible only to software threads executing on a particular processing core. Work stealing may suffer similarly in high software thread count situations, and may also suffer from the overhead costs associated with stealing unprocessed workloads from software threads running on different cores (i.e. remote software threads). Thus, there is a need to improve load imbalances in processing devices.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, methods and apparatus to rebalance workloads among processing cores utilize a hybrid work donation and work stealing technique that improves workload imbalances within processing devices such as, for example, GPUs. A combination of both work donation and work stealing is employed among multiple processing cores to improve the load balancing of software thread execution. In one example, the methods and apparatus allow for workload distribution between a first processing core and a second processing core by providing queue elements from one or more workgroup queues associated with workgroups executing on the first processing core to a first donation queue that may also be associated with the workgroups executing on the first processing core. The method and apparatus also determine if a queue level of the first donation queue is beyond a threshold, and if so, steal one or more queue elements from a second donation queue associated with workgroups executing on the second processing core. For example, if the queue level of the first donation queue is below a minimum threshold, enough queue elements from the second donation queue may be obtained such that the queue level of the first donation queue is at or above the minimum threshold.

In one embodiment an electronic device, such as a GPU, for example, determines whether a queue level of the second donation queue is beyond a threshold to decide whether to steal any queue elements from the second donation queue. For example, queue elements may be obtained from the second donation queue as long as the queue level of the second donation queue is above a minimum threshold. In one embodiment, an electronic device may determine whether a queue level of at least one workgroup queue associated with workgroups executing on the first processing core is beyond a threshold to decide whether to steal any queue elements from the second donation queue. In one embodiment, an electronic device may provide queue elements from one or more workgroup queues associated with workgroups executing on a first processing core to a donation queue, also associated with workgroups executing on the first processing core, through the use of atomic operations that operate within a processing core scope. As such, reads and writes to memory available to software threads executing on a particular core, which may be necessary to donate (e.g. transfer) unprocessed workloads are synchronized among the various software threads executing on that particular core. For example, because the first donation queue is provided with queue elements from workgroup queues associated with workgroups executing the first processing core, the first donation queue may be stored in an area of L1 cache memory that is accessible only to software threads executing on the first processing core. Workgroup queue elements may be provided to the first donation queue by, for example, executing a write command to the L1 cache memory to write the queue element into the donation queue. To avoid software thread synchronization issues due to various software threads executing on one particular core having access to the same area of the L1 cache memory, the write command may be executed atomically. For example, the write command may be a write instruction tagged with an atomic attribute.

In one embodiment, an electronic device determines whether one or more workgroup queues associated with workgroups executing on a first processing core are beyond a threshold. If so, queue elements are provided from the workgroup queues to a first donation queue associated with the workgroups executing on the first processing core. For example, if a workgroup queue level is greater than a minimum threshold, such that the number of queue elements representing unprocessed workloads is more than a minimum amount, queue elements are provided from the workgroup queue to the donation queue. The queue element may also be removed (e.g. deleted) from the workgroup queue. In one embodiment, queue elements are provided from one or more workgroup queues associated with workgroups executing on the first processing core to the first donation queue based on determined queue levels of the workgroup queues associated with the workgroups executing on the first processing core.

In one embodiment, an electronic device provides queue elements from one or more workgroup queues associated with workgroups executing on a second processing core to a second donation queue associated with the workgroups executing on the second processing core. In one embodiment, an electronic device provides the queue elements from the one or more workgroup queues associated with workgroups executing on the second processing core to the second donation queue based on determined queue levels of the one or more workgroup queues associated with the workgroups executing on the second processing core. In one embodiment an electronic device provides determines the queue levels of the first donation queue and the second donation queue. The electronic device may then steal one or more queue elements from the second donation queue, to be queued into the first donation queue, based on the determined queue levels of the first and second donation queues. For example, one or more queue elements may be obtained by the first donation queue from the second donation queue if the first donation queue holds less than a first minimum amount of queue elements, and the second donation queue holds more than a second minimum amount of queue elements.

Among other advantages, unprocessed workloads as represented by queue elements in workgroup queues may be more evenly distributed among various processing cores within a processing device, such as a GPU. The problems associated with irregular parallelism may also be minimized. For example, processing devices may be presented with applications that require irregular workloads, such as those including processing with unknown or unpredictable execution times or those that may require unknown hardware resources (e.g. memory resources). By rebalancing workloads across various processing cores in accordance with the hybrid work donation and work stealing methods described herein, the work may be more evenly distributed across the various processing cores. In addition, because actual work load distributions are typically only known at runtime due to data-dependent features of software threads, or due to dynamic parallelism implementations, the dynamic nature of these methods allows for a more efficient distribution of workloads among processing cores. Persons of ordinary skill in the art would recognize and appreciate further advantages as well.

Figure 1:
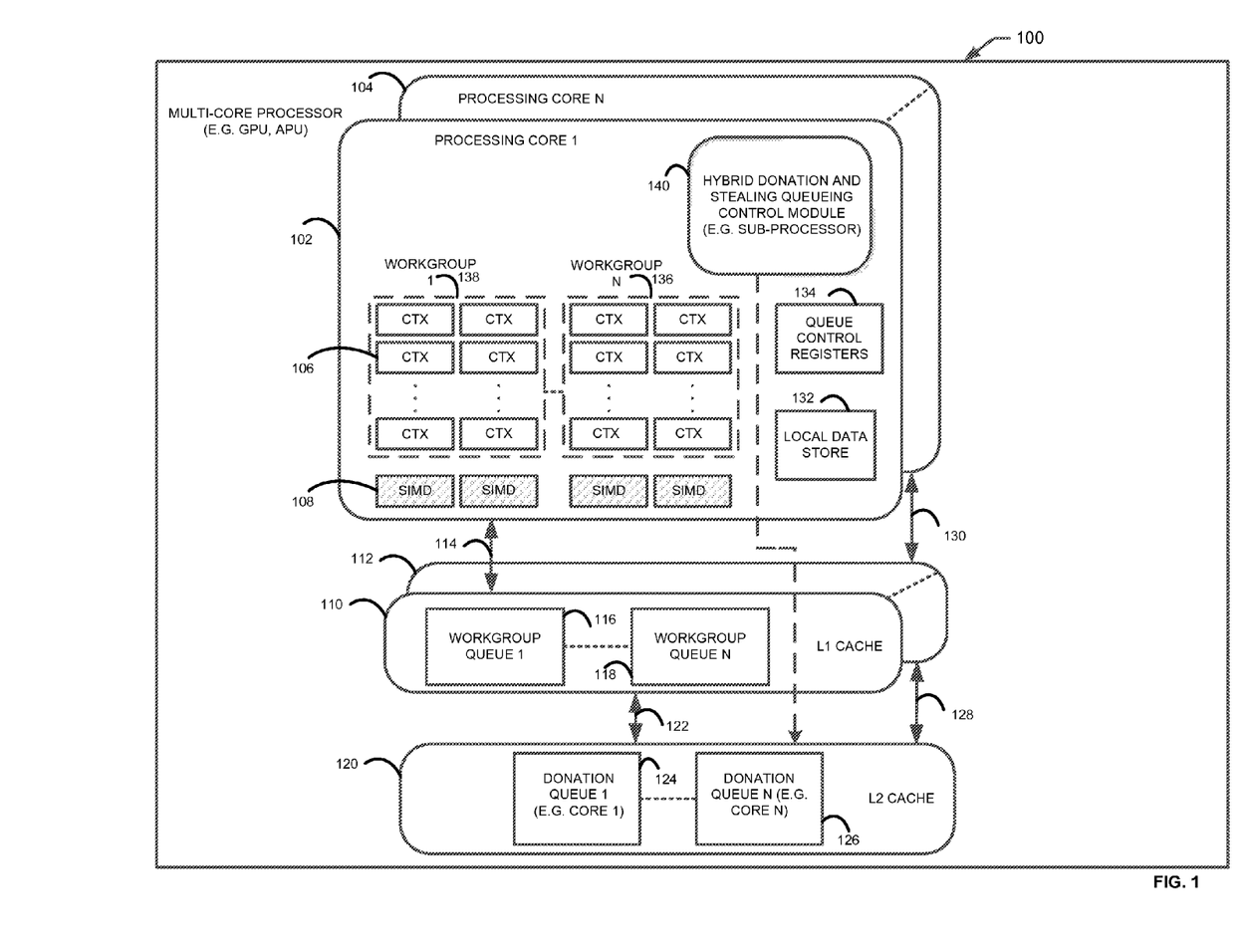
FIG. 1 is a functional block diagram illustrating an example processing device, such as a GPU, that includes multiple cores with a hybrid donation and stealing queue module within each core that manages workgroup load imbalances.

Turning now to the drawings, and as described in detail below, one example of the presently disclosed system, as shown in FIG. 1, is a multi-core processor 100, such as a GPU, with multiple processing cores that execute software threads. In some embodiments, multi-core processor 100 may be an accelerated processing unit (APU), a central processing unit (CPU), a field programmable gate array (FPGA), or an application-specific integrated circuits (ASIC), or other suitable instruction processing device with multiple cores. In some embodiments, some or all of the functions of multi-core processor 100 may be performed by any suitable processor or processors that may, for example, execute a software driver, firmware, or any other suitable executable code stored in memory. As shown, multi-core processor 100 includes processing core 1 102 and processing core N 104. As recognized by those of ordinary skill in the art, the number of processing cores is variable. For example, the multi-core processor 100 may include 16, 32, or any suitable number of processing cores. In addition, each processing core includes a hybrid donation and stealing queueing control module 140 that allows for the rebalancing of workloads between the various processing cores, such as processing cores 1 102 and processing core N 104, and as further described below. The hybrid donation and stealing queueing control module 140 may be, for example, a sub-processor within a processing core of a multi-core processing device, or an execution unit within a processing core, such as a SIMD unit. The hybrid donation and stealing queueing control module 140 may also be a processor, state machine, FPGA, or any other suitable logic. Although the hybrid donation and stealing queueing control module 140, as shown in FIG. 1, appears within each processing core 1 102 and processing core N 104, it is appreciated that the hybrid donation and stealing queueing control module 140 may be external and common to processing cores. For example, rather than having one hybrid donation and stealing queueing control module 140 per core, there would be one hybrid donation and stealing queueing control module 140 per multi-core processor 100, such that the hybrid donation and stealing queueing control module 140 would serve all processing cores in a manner similar to that described below.

Each processing core also includes multiple workgroups. As shown, each processing core (102, 104) includes a workgroup 1 138 and workgroup N 136. Although only workgroup 1 138 and workgroup N 136 are shown, those of ordinary skill in the art recognize that, although limited by a multi-core processor's resources, the number of workgroups per processing core is variable. Each workgroup 1 and N (138, 136) may include one or more wavefronts whereby a wavefront may include one or more wavefront software threads that execute in lockstep on a particular SIMD unit 108. Workgroups (138, 136) may also include one or more wavefront software thread contexts (CTX) 106 which maintain the state for an executing wavefront (e.g. software threads executing in lockstep on a particular SIMD unit).

In addition each processing core (102, 104) may also include a local data store 132, as well as queue control registers 134. The queue control registers 134 may include registers that define the location of one or more workgroup queues, such as workgroup queue 1 116 and workgroup queue N 118, and one or more donation queues, such as donation queue 1 124 and donation queue N 126, described further below. For example, workgroup queues may be configured at runtime, with the location of the queues being programmed into the queue control registers 134. The queue control registers 134 may also store queue threshold levels, which may also be configured at runtime, to define threshold levels that the hybrid donation and stealing queueing control module 140 may read for comparison purposes, as described further below. In addition, the hybrid donation and stealing queueing control module 140 may store information, such as queue levels, in local data store 132. For example, the hybrid donation and stealing queueing control module 140 may obtain the current level of the first donation queue and store it in local data store 132. The hybrid donation and stealing queueing control module 140 may then read a threshold corresponding to the first donation queue from the queue control registers 134, and compare it against the stored level of the first donation queue, to determine if the queue level of the first donation queue is, for example, below the threshold. If so, the hybrid donation and stealing queueing control module 140 may steal one or more queue elements from a second donation queue associated with workgroups executing on a second processing core, such as processing core N 104.

The multi-core processor 100 also includes L1 cache memory 110, 112, and L2 cache memory 120. Although L1 cache memory 110, 112 and L2 cache memory 120 are shown as on-chip memory, it is appreciated that they may be any suitable memory, whether on-chip or off-chip. Processing core 1 102 has access to L1 cache memory 110 over communication link 114, and processing core N 104 has access to L1 cache memory 112 over communication link 130, as known in the art. As such, L1 cache memory 110 is within the scope of processing core 1 102 (e.g. within a processing core scope), whereas L1 cache memory 112 is within the scope of processing core N 104. For example, while software threads executing on processing core 1 102 may read or write to L1 cache memory 110 over communication link 114, they do not have access to L1 cache memory 112. Similarly, while software threads executing on processing core N 104 may read or write to L1 cache memory 112 over communication link 130, they do not have access to L1 cache memory 110.

L1 cache memory 110 may store workgroup queues, such as workgroup queue 1 116 and workgroup queue N 118. Workgroup queue 1 116 stores work queue elements representing unprocessed workloads that may be executed by software threads associated with workgroup 1 138. Similarly, workgroup queue N 118 stores work queue elements representing unprocessed workloads that may be executed by software threads associated with workgroup N 136.

As shown, processing core 102 has access to L2 cache memory 120 via the L1 cache memory 110, over communication link 122, as known in the art. Similarly, processing core 104 has access to L2 cache memory 120 via the L1 cache memory 112, over communication link 128, as known in the art. For example, L2 cache memory 120 access may be provided as a read-through or write-through operation, such that a read or write to L1 cache memory L1 110 or L1 cache memory L1 112 is synchronized to the L2 cache memory 120. Because L2 cache memory 120 is accessible to software threads executing on both processing core 1 102 and processing core N 104, L2 cache memory 120 is within the scope of the multi-core processor 100 (e.g. within a device scope). Thus, data stored on L2 cache memory 120 must be synchronized across various processing cores to ensure data consistency. Donation queue 1 124 and donation queue N 126 may be stored in the L2 cache memory 120. In this fashion, a hybrid donation and stealing queueing control module 140 within a processing core has the ability to steal queue elements from a donation queue associated with a different processing core. For example, hybrid donation and stealing queueing control module 140 may provide a read command with a read-through attribute enabled to read a queue element of donation queue N 126, which is associated with software threads executing on processing core N 104. Hybrid donation and stealing queueing control module 140 may also provide write commands with a write-through attribute enabled to write to donation queue N 126, for example, as may be required to remove a queue element from donation queue N 126 (e.g. write to a current read donation queue N pointer, so as to remove a queue element from the donation queue N 126).

In one embodiment, as discussed further below, hybrid donation and stealing queueing control module 140 may issue queue or dequeue commands to carry out the queueing or dequeueing of queue elements to workgroup queues (116, 118) or donation queues (124, 126). These commands may be programmed, for example, to be executed by the multiprocessor 100 on either processing core 102 or processing core N 104 via the use of tagging instructions that may execute as scoped operations. For example, the tagging instructions may allow the queue or dequeue commands to be executed atomically within a processing core scope or device scope.

Figure 2:
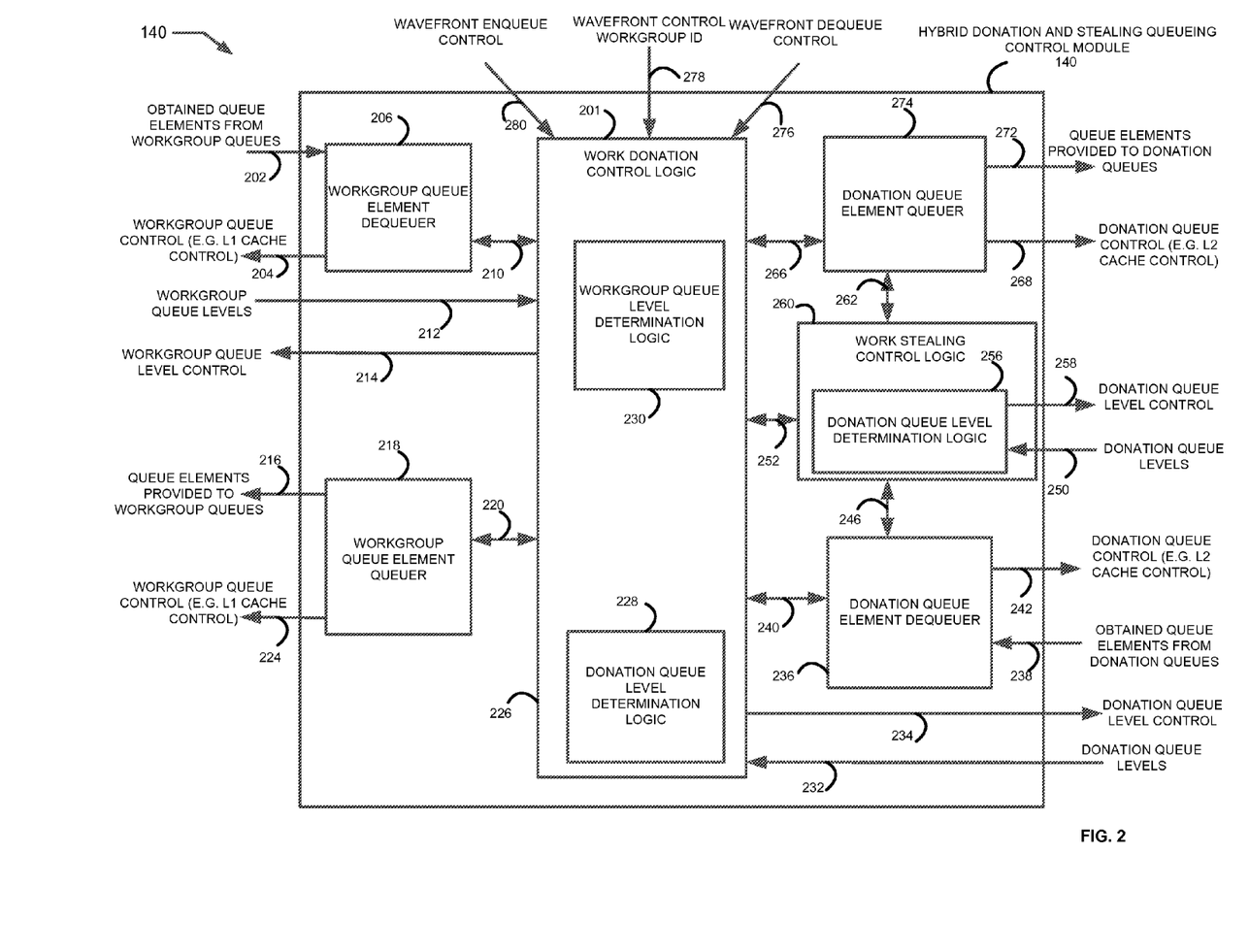
FIG. 2 is a functional block diagram of the example hybrid donation and stealing queue module of FIG. 1.

FIG. 2 is a functional block diagram of the example hybrid donation and stealing queue module 140 of FIG. 1. As indicated in the figure, the hybrid donation and stealing queue module 140 includes work donation control logic 201 and work stealing control logic 260, as well as workgroup queue element dequeuer 206, workgroup queue element queuer 218, donation queue element queuer 274, and donation queue element dequeuer 236. As described with respect to FIG. 1, hybrid donation and stealing queue module 140 may have access to workgroup queues, such as workgroup queue 1 116 associated with processing core 1 102, and workgroup queue N 118 associated with processing core N 104, to allow for the queueing or dequeing of workgroup queue elements. As shown in FIG. 2, workgroup queue element queuer 218 and workgroup queue element dequeur 206 allow for the queing or dequeing of workgroup elements, respectively. For example, the workgroup queue element dequeuer may obtain queue elements from workgroup queues over communication link 202 by providing workgroup queue control signaling over communication link 204. Communication link 202 may be, for example, a data link to L1 cache memory 110, whereas communication link 204 may be a set of read and write commands to the L1 cache memory 110 to allow for the removal of a queue element from a workgroup queue. Similarly, workgroup queue element queuer 218 may provide queue elements to workgroup queues over communication link 216, while providing workgroup queue control signaling over communication link 224.

In addition, hybrid donation and stealing queue module 140 may have access to donation queues, such as donation queue 1 124 that may be associated with workgroup 1 138, and donation queue N 126 that may be associated with a processing core N 104 workgroup, to allow for the queueing and dequeuing of donation queue elements. Donation queue element queuer 274 and donation queue element dequeuer 236 allow for the queuing and dequeing of donation queue elements, respectively. For example, the donation queue element queuer may provide queue elements from donation queues over communication link 272 by providing donation queue control signaling over communication link 268. Such signaling may be, for example, a set of read and write commands that were tagged with a device scope attribute, thus guaranteeing a read or write to memory, such as to the L2 cache memory 120, to add a queue element to a donation queue. Similarly, the donation queue element dequeuer may steal queue elements from donation queues over communication link 238 by providing donation queue control signaling over communication link 242.

Work donation control logic 201 includes workgroup queue level determination logic 230 as well as donation queue level determination logic 228 which allow for the determination of workgroup and donation queue levels, respectively. For example, workgroup queue level determination logic 230 may obtain workgroup queue levels from workgroup queues, such as workgroup queue 1 116 associated with processing core 1 102, and workgroup queue N 118 associated with processing core N 104, over communication link 212 by providing workgroup queue level control signaling over communication link 214. As an example, the workgroup queues may be stored in memory such as L1 cache memory 110. Communication link 214 may allow for a read command to read workgroup queue level data stored in L1 cache memory 110, whereas the workgroup queue level data is provided over communication link 212. Similarly, donation queue level determination logic 228 may obtain donation queue levels over communication link 232 by providing donation queue level control signaling over communication link 234. For example, donation queues may be stored in memory such as L2 cache memory 120. Communication link 234 may allow for a read command to read donation queue level data stored in L2 cache memory 120, such that the donation queue level data is provided over communication link 232. Thus, for example, work donation control logic 201 may provide queue elements from one or more workgroup queues associated with workgroups executing on a first processing core to a first donation queue that is also associated with the workgroups executing on the first processing core.

Work donation control logic 201 may also include logic that allows wavefronts to queue or dequeue queue elements to workgroup queues or donation queues. For example, a wavefront, such as one associated with workgroup 1 138 with software threads executing on processing core 1 102, may enqueue queue elements to workgroup queue 1 116 by providing wavefront enqueue control signaling over communication link 280, while specifying a wavefront control workgroup ID (e.g. workgroup 1) over communication link 278. Similarly, a wavefront may dequeue queue elements from a workgroup queue by providing wavefront dequeue control signaling over communication link 276, while specifying a wavefront control workgroup ID over communication link 278. In one embodiment, wavefronts enqueue workgroup queues at startup, for example as part of an initialization procedure, so as to originally populate the workgroup queues.

Work donation control logic 201 is operatively coupled to donation queue element queuer 274 via communication link 266 such that queue elements may be provided to donation queues, as described above. Similarly, work donation control logic 201 is operatively coupled to donation queue element dequeuer 236 via communication link 240 such that queue elements may be obtained from donation queues. Work donation control logic 201 is also operatively coupled to workgroup queue element dequeuer 206 over communication link 210, and to workgroup queue element queuer 218 over communication link 220. In this fashion, work donation control logic 201 is able to queue and dequeue workgroup queues as described above.

As mentioned above, hybrid donation and stealing queueing control module 140 also includes work stealing control logic 260. Work stealing control logic 260 includes donation queue level determination logic 256, which is similar to donation queue level determination logic 228, in that it allows for the determination of donation queue levels as described above. For example, donation queue level determination logic 256 may obtain donation queue levels over communication link 250 by providing donation queue level control signaling over communication link 258. Thus, work stealing control logic 260 may determine if a queue level of a donation queue is beyond a threshold by obtaining a donation queue level via the donation queue level determination logic 256, and comparing it to the threshold (e.g., a threshold in queue control registers 134).

Work stealing control logic 260 is also operatively coupled to the donation queue element queuer 274 over communication link 262, and to donation queue element dequeuer 236 over communication link 246. Thus, work stealing control logic 260 is able to queue and dequeue donation queues as described above. For example, work stealing control logic 260 may obtain one or more queue elements from a donation queue associated with workgroups executing on a second processing core, such as processing core N 104 of multi-core processor 100.

In one embodiment, one or more of the workgroup queue element dequeuer 206, workgroup queue element queuer 218, donation queue element queuer 274, donation queue element dequeuer 236, workgroup queue level determination logic 230, and donation queue level determination logic 228, 256, may also be implemented as programmed tagged instructions that may execute as scoped operations. The tagging instructions allow operations to be atomically executed within a particular scope, such as a processing core scope or device scope, such that data read or written is synchronous within the particular scope. For example, the workgroup queue element queuer 218 may be implemented as a programmed workgroup queue element queuer instruction, such that when executed, queues a specified workgroup queue with an additional queue element. The workgroup queue element queuer instruction may be carried out atomically within a processing core scope, such that data read or written from the workgroup queue is synchronized among the software threads executing on a particular processing core.

Figure 3:
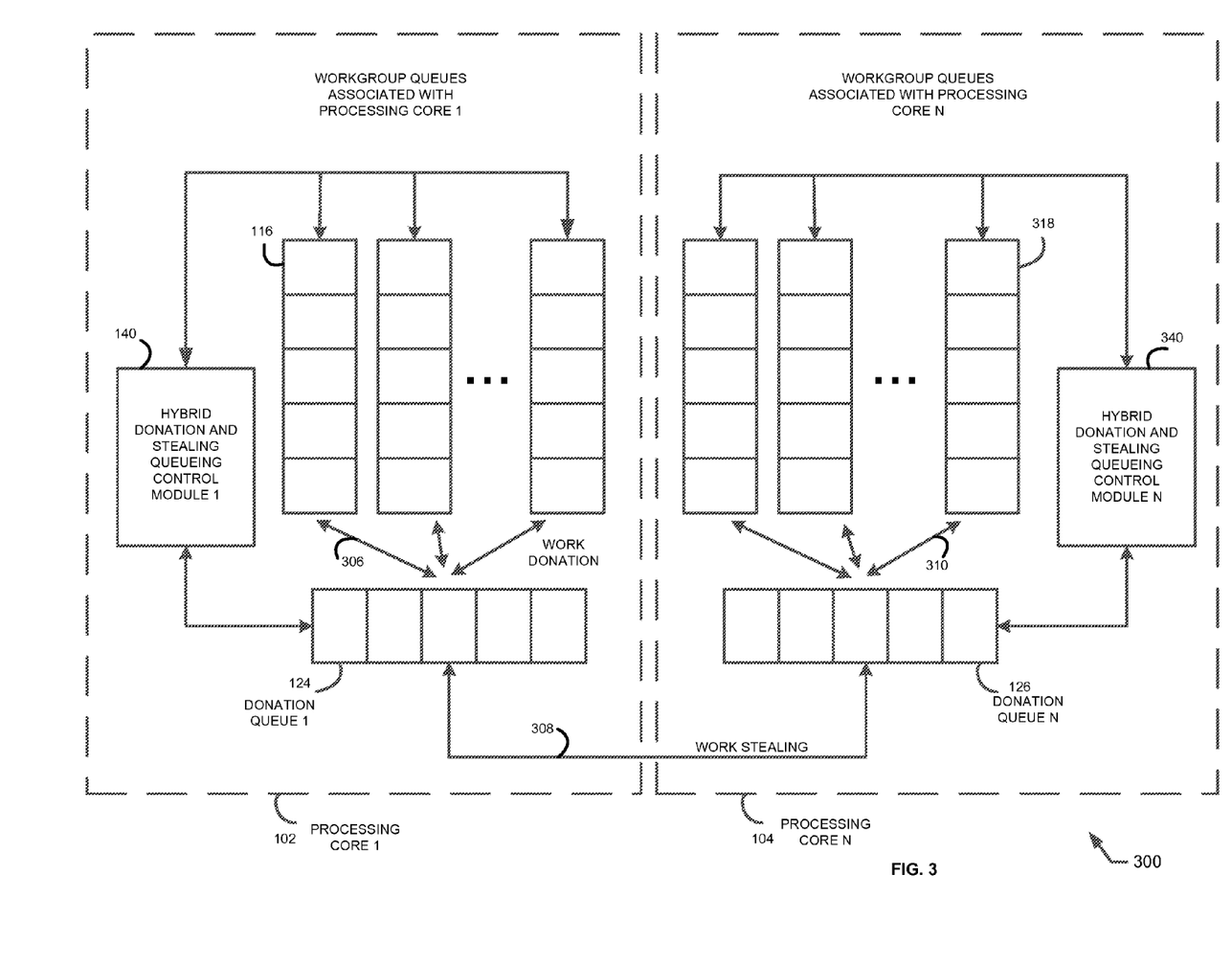
FIG. 3 is a functional block diagram of multiple processing cores that each include an example hybrid donation and stealing queue module as well as workgroup queues associated with workgroups executing on each processing core.

FIG. 3 is a functional block diagram of multiple processing cores including processing core 1 102 and processing core N 104 whereby that include a hybrid donation and stealing queue module (140, 340) as well as workgroup queues (116, 318) associated with workgroups executing on each processing core. As indicated in the diagram, processing core 1 102 includes hybrid donation and stealing queue module 140 that may perform work donation 306 by providing queue elements from one or more workgroup queues (e.g. workgroup queue 116) to donation queue 1 124. Similarly, processing core N 104 includes hybrid donation and stealing queue module 340 that may perform work donation 310 by providing queue elements from one or more workgroup queues (e.g. workgroup queue 318) to donation queue N 126 as further described above. In addition, each hybrid donation and stealing queue module (140, 340) may perform work stealing 308 by stealing queue elements from a donation queue associated with a different processing core, as further described above. For example, hybrid donation and stealing queueing control module 1 140, associated with processing core 1 102, may obtain queue elements for donation queue N 126, which is associated with processing core N 104. Similarly, hybrid donation and stealing queueing control module 1 340, associated with processing core N 104, may obtain queue elements for donation queue 1 124, which is associated with processing core 1 102.

Figure 4:
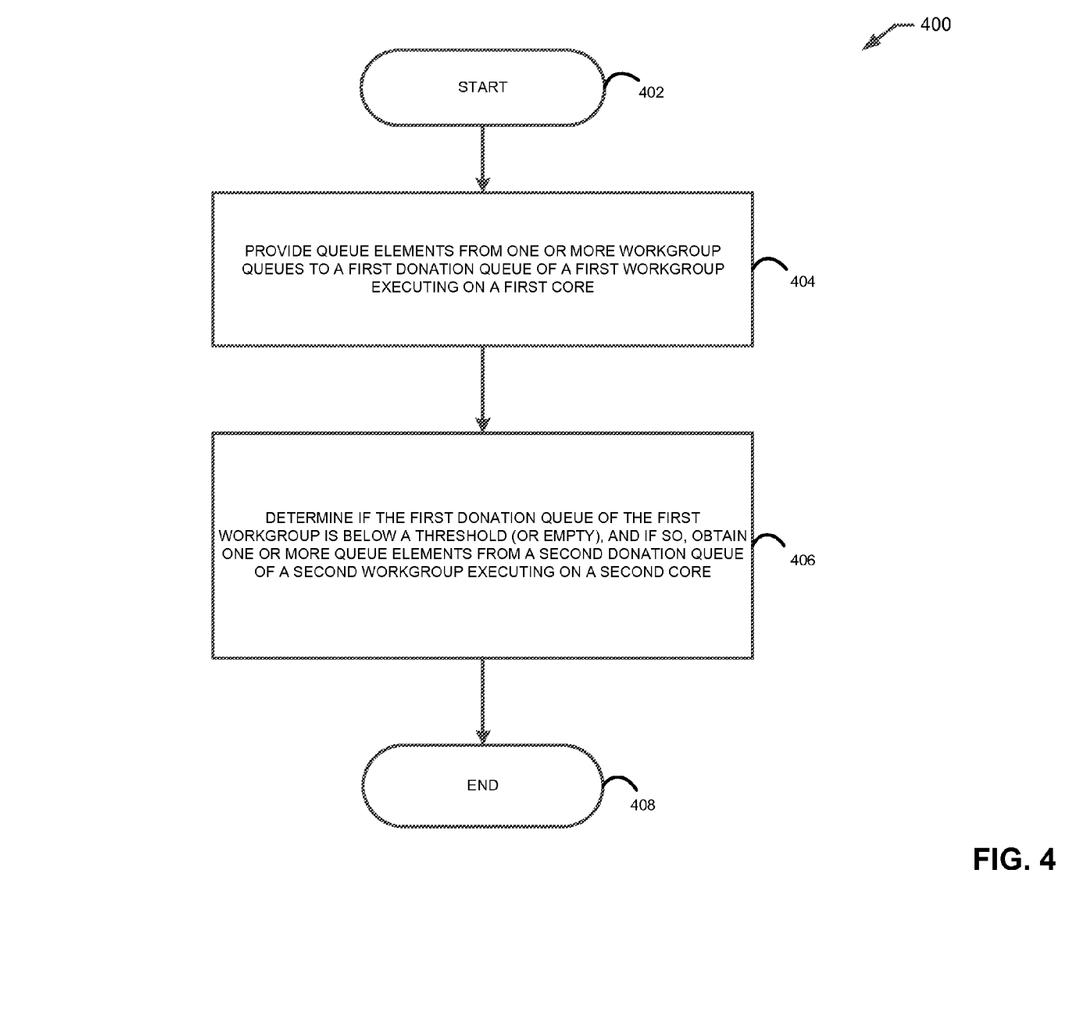
FIG. 4 is a flowchart of an example method for managing processing core load imbalances among workgroups executing on different processing cores.

FIG. 4 is a flowchart of an example method for managing processing core load imbalances among workgroups executing on different processing cores. The method illustrated in FIG. 4, and each of the example methods described herein, may be carried out by multi-core processor 100. As such, the method may be carried out by hardware or a combination of hardware and hardware executing software. Suitable hardware may include one or more GPUs, CPUs, APUs, application specific integrated circuits (ASICs), state machines, field programmable gate arrays (FPGAs), digital signal processors (DSPs), and/or other suitable hardware. Although the method(s) is/are described with reference to the illustrated flowcharts (e.g., in FIG. 4), it will be appreciated that many other ways of performing the acts associated with the method(s) may be used. For example, the order of some operations may be changed, and some of the operations described may be optional. Additionally, while the method(s) may be described with reference to the example apparatus 100, it will be appreciated that the method(s) may be implemented by other apparatus as well, and that the apparatus 100 may implement other methods.

The example begins at block 404, where queue elements are provided from one or more workgroup queues to a first donation queue of a first workgroup executing on a first processing core, such as may be performed by the hybrid donation and stealing queueing module 140 of FIG. 1. The method continues to block 406, where one or more queue elements are stolen from a second donation queue of a second workgroup executing on a second processing core if it is determined that the first donation queue of the first workgroup is below a threshold (e.g. is empty).

Figure 5:
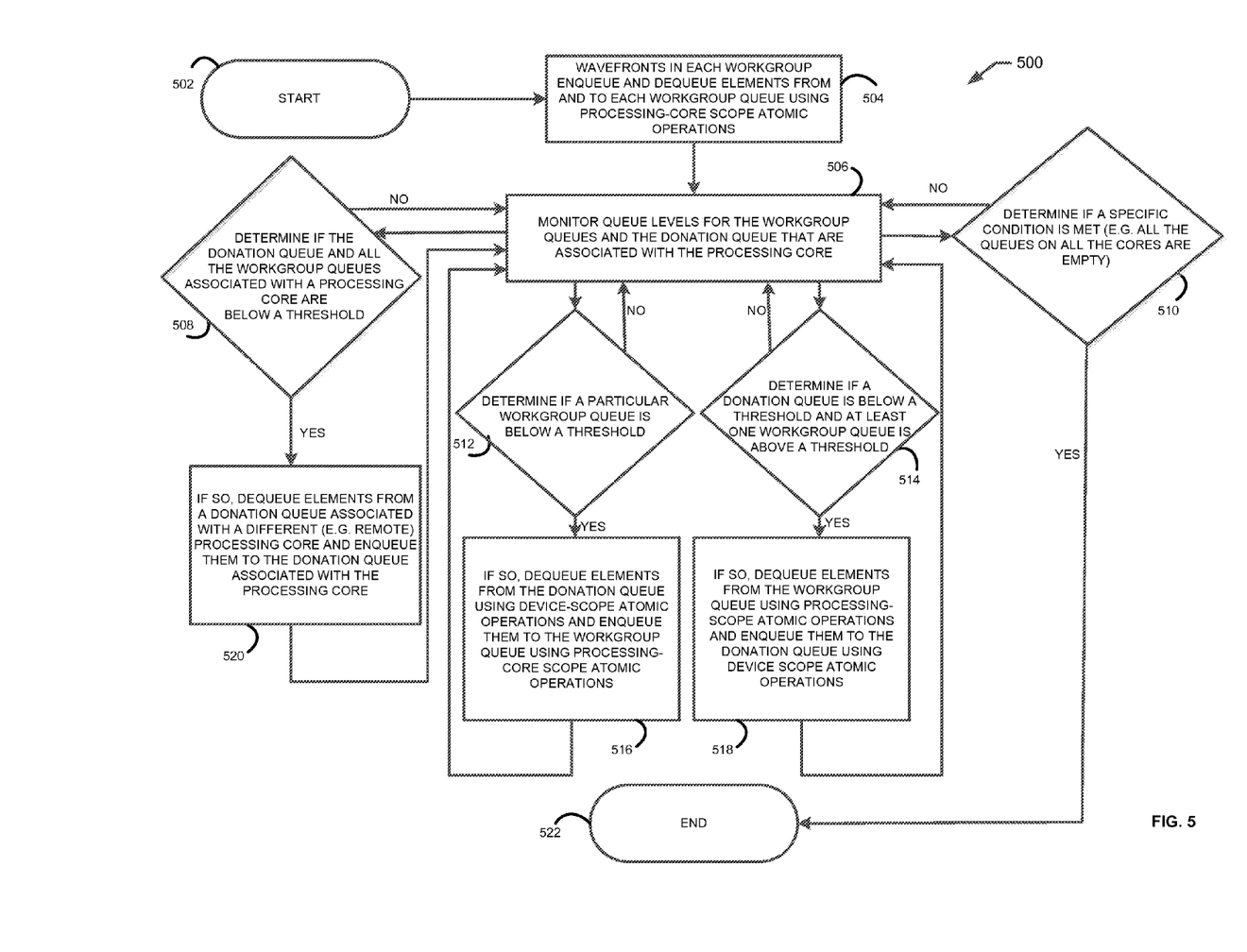
FIG. 5 is a more detailed flowchart of an example method for managing processing core load imbalances among workgroups executing on different processing cores.

FIG. 5 is a flowchart of another example method for managing processing core load imbalances among workgroups executing on different processing cores, and also includes the queueing and dequeueing of queue elements to workgroup queues using processing core scope atomic operations, and the queueing and dequeueing of queue elements to donation queues using device scope atomic operations, as may be performed, for example, by multi-core processor 100. The method begins at block 504, where wavefronts in each workgroup enqueue and dequeue elements from and to each workgroup queue using processing core scope atomic operations. For example, the hybrid donation and stealing control module 140 may allow wavefronts associated with workgroup 1 138 and workgroup N 136 to enqueue and dequeue queue elements to workgroup queue 1 116 and workgroup queue N 118. The method then continues to block 506, where queue levels for the workgroup queues and a donation queue associated with a particular processing core are monitored, such as may be performed by the hybrid donation and stealing control module 140. The method then continues along four different paths.

Along one path, the method continues to block 508, where a determination is made as to whether the donation queue and all of the workgroup queues associated with a processing core are below a threshold (e.g. are empty). If a determination is made that a donation queue and all of the workgroup queues associated with a processing core are below a threshold, the method continues to block 520. Otherwise, the method proceeds back to block 506. At block 520, queue elements are dequeued from a donation queue associated with a different processing core, and are enqueued to the donation queue associated with the first processing core. Thus, for example, the hybrid donation and stealing queueing control module 140 of FIG. 1, which is associated with processing core 102, may obtain queue elements from donation queue N 126, which is associated with processing core N 104, and queue them into donation queue 1 124, which is associated with processing core 1 102. The method then proceeds back to block 506.

Along another path, the method proceeds from block 506 to block 512, where a determination is made of whether a particular workgroup queue is below a threshold. If a determination is made that a particular workgroup queue is below a threshold, the method proceeds to block 516. Otherwise the method proceeds back to block 506. At block 516, queue elements are dequeued from the donation queue using device scope atomic operations, and enqueued to the workgroup queue using processing core scope atomic operations. The method then proceeds back to block 506.

Along a third path, the method proceeds from block 506 to block 514, where a determination is made of whether a donation queue is below a threshold and at least one workgroup queue is above a threshold. If a determination is made that a donation queue is below a threshold and at least one workgroup queue is above a threshold, the method proceeds to block 518. Otherwise the method proceeds back to block 506. At block 518, queue elements are dequeued from the workgroup queue using processing core scope atomic operations, and are enqueued to the donation queue using device scope atomic operations. The method then proceeds back to block 506.

Along a fourth path, the method proceeds from block 506 to block 510, where a determination is made as to whether a specific condition is met. For example, the specific condition may be that all workgroup queues and donation queues on all processing cores are empty. If so, the method ends. Otherwise, the method proceeds back to block 506.

Figure 6:
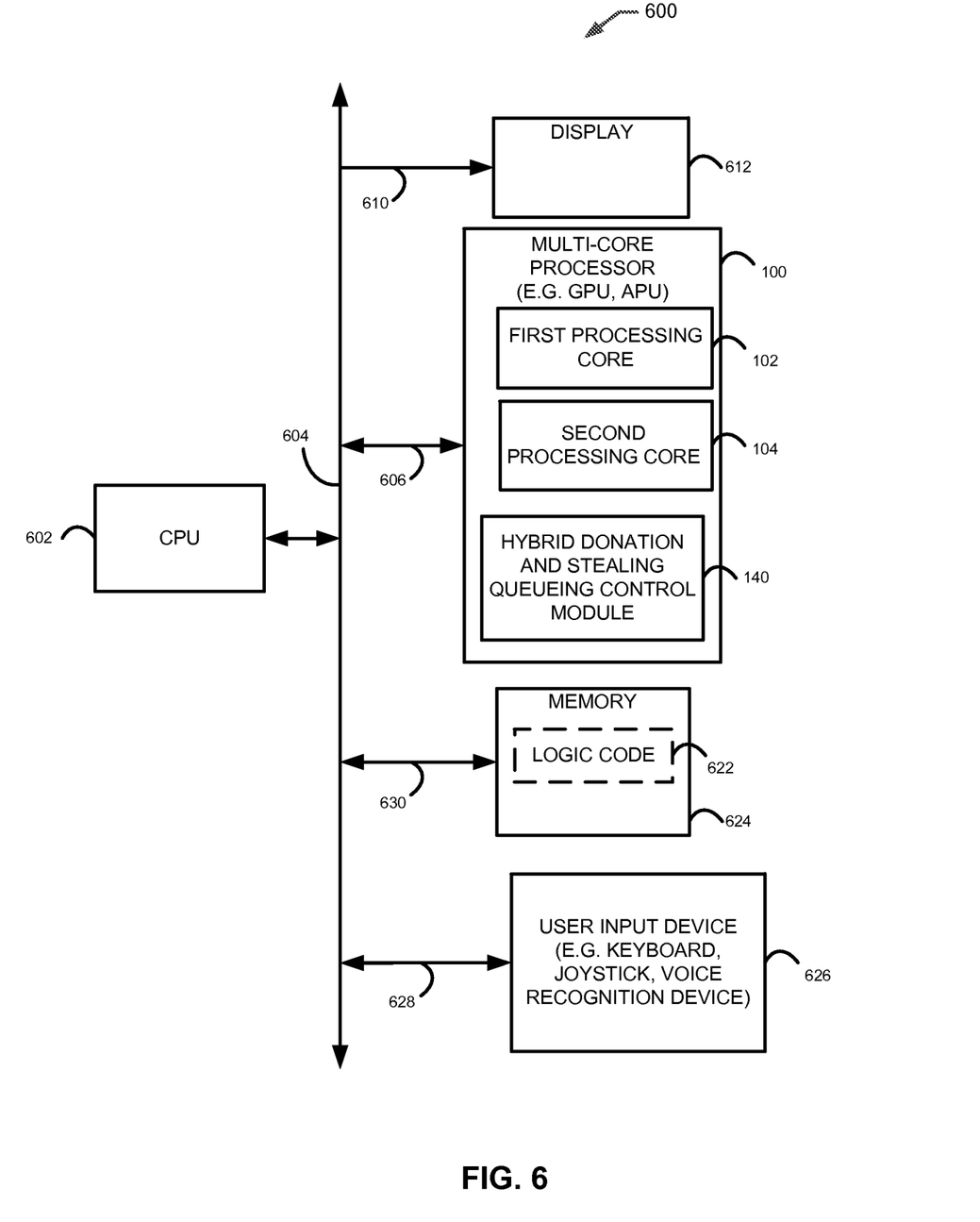
FIG. 6 is a functional block diagram illustrating an example apparatus employing a hybrid donation and stealing queue module in accordance with one example as set forth below.

In some examples, executable suitable instructions may be stored on a computer readable storage medium, where the executable instructions are executable by one or more processors to cause the one or more processors to perform the actions described herein. FIG. 6 is a functional block diagram of another example embodiment 600 that illustrates an example apparatus including the multi-core processor 100 of FIG. 1, which includes multiple cores (102, 104) and a hybrid donation and stealing queue module 140, a central processing unit (CPU) 602, and logic code 622 residing in memory 624. In some embodiments, memory 624, examples of which include random access memory (RAM), non-volatile memory (e.g., read-only memory (ROM), flash memory, EPROM, EEPROM, etc.), a disk storage device, or any other suitable memory, may store executable instructions including logic code 622 that when executed by multi-core processor 100 performs some or all of the functions described above with respect to the multi-core processor 100 of FIG. 1.

Multi-core processor 100 may access bus 604 over communication link 606 to access, for example, logic code 622 stored in memory 624. Bus 604 can be, for example, any number of interconnects allowing communication among the various devices. Display 612 may include any suitable display device, and may receive content to be displayed from multi-core processor 100 over expansion bus 604. The example embodiment 600 may also include one or more of user input device 626 that communicates with bus 604 over communication link 628, for example, to allow a user to provide input, such as in gaming systems. Some or all of this functionality may also be implemented in any other suitable manner such as but not limited to a software implementation, including, for example, a driver implementation, a firmware implementation, a hardware implementation, or any suitable combination of the example implementations described above.

Among other advantages, the methods and apparatus described herein allow unprocessed workloads as represented by queue elements in workgroup queues to be more evenly distributed among various processing cores within a processing device, such as a GPU. The problems associated with irregular parallelism may also be minimized. For example, processing devices may be presented with applications that require irregular workloads, such as those including processing with unknown or unpredictable execution times or those that may require unknown hardware resources (e.g. memory resources). By rebalancing workloads across various processing cores in accordance with the hybrid work donation and work stealing methods described herein, the work may be more evenly distributed across the various processing cores. In addition, because actual work load distributions are typically only known at runtime due to data-dependent features of software threads, or due to dynamic parallelism implementations, the dynamic nature of these methods allows for a more efficient distribution of workloads among processing cores. Persons of ordinary skill in the art would recognize and appreciate further advantages as well.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto. The above detailed description of the embodiments and the examples described therein have been presented for the purposes of illustration and description only and not by limitation. It is therefore contemplated that the present invention cover any and all modifications, variations, or equivalents that fall within the spirit and scope of the basic underlying principles disclosed above and claimed herein.

What is claimed is:

1. A method for workload distribution between a first processing core and a second processing core comprising:
providing queue elements from one or more workgroup queues associated with workgroups executing on the first processing core to a first donation queue associated with the workgroups executing on the first processing core atomically and within a device scope of the first processing core and the second processing core; and
when a queue level of the first donation queue is below a first threshold, stealing one or more queue elements from a second donation queue associated with workgroups executing on the second processing core to the first donation queue atomically and within the device scope of the first processing core and the second processing core.

2. The method of claim 1, wherein stealing the one or more queue elements from the second donation queue associated with the workgroups executing on the second processing core is performed when the queue level of the first donation queue is below the first threshold and a queue level of the second donation queue is below a second threshold.

3. The method of claim 1, wherein stealing the one or more queue elements from the second donation queue associated with the workgroups executing on the second processing core is performed when the queue level of the first donation queue is below the first threshold and a queue level of the one or more workgroup queues associated with workgroups executing on the first processing core is below a third threshold.

4. The method of claim 1 wherein providing queue elements from the one or more workgroup queues associated with the workgroups executing on the first processing core to the first donation queue associated with the workgroups executing on the first processing core is performed when the one or more workgroup queues associated with the workgroups executing on the first processing core are beyond a fourth threshold.

5. The method of claim 1 comprising:
determining queue levels of the one or more workgroup queues associated with the workgroups executing on the first processing core, wherein providing the queue elements from the one or more workgroup queues associated with the workgroups executing on the first processing core to the first donation queue associated with the workgroups executing on the first processing core is based on the determined queue levels of the one or more workgroup queues associated with the workgroups executing on the first processing core;
determining queue levels of one or more workgroup queues associated with the workgroups executing on the second processing core; and
providing the queue elements from the one or more workgroup queues associated with the workgroups executing on the second processing core to the second donation queue associated with the workgroups executing on the second processing core based on the determined queue levels of the one or more workgroup queues associated with the workgroups executing on the second processing core.

6. The method of claim 1 comprising:
determining the queue level of the first donation queue; and
determining a queue level of the second donation queue, wherein stealing the one or more queue elements from the second donation queue associated with the workgroups executing on the second processing core is based on the determined queue level of the first donation queue and the determined queue level of the second donation queue.

7. An electronic device comprising:
a processor that is operative to:
provide queue elements from one or more workgroup queues associated with workgroups executing on a first processing core to a first donation queue associated with the workgroups executing on the first processing core atomically and within a device scope of the first processing core and the second processing core; and
when a queue level of the first donation queue is below a first threshold, steal one or more queue elements from a second donation queue associated with workgroups executing on the second processing core to the first donation queue atomically and within the device scope of the first processing core and the second processing core.

8. The electronic device of claim 7, wherein the processor is operative to steal the one or more queue elements from the second donation queue associated with the workgroups executing on the second processing core when the queue level of the first donation queue is below the first threshold and a queue level of the second donation queue is below a second threshold.

9. The electronic device of claim 7, wherein the processor is operative to steal the one or more queue elements from the second donation queue associated with the workgroups executing on the second processing core when the queue level of the first donation queue is below the first threshold and a queue level of the one or more workgroup queues associated with workgroups executing on the first processing core is below a third threshold.

10. The electronic device of claim 7, wherein processor to provide the queue elements from the one or more workgroup queues associated with the workgroups executing on the first processing core to the first donation queue associated with the workgroups executing on the first processing core when the one or more workgroup queues associated with the workgroups executing on the first processing core are beyond a fourth threshold.

11. The electronic device of claim 7 comprising:
a first memory device operatively coupled to the first processing core, wherein the first memory device stores the one or more workgroup queues associated with the workgroups executing on the first processing core;
a second memory device operatively coupled to the second processing core, wherein the second memory device stores one or more workgroup queues associated with workgroups executing on the second processing core;
a third memory device operatively coupled to the first and second processing cores, wherein the third memory device stores the first donation queue and the second donation queue.

12. The electronic device of claim 7, wherein the processor comprises work donation control logic operative to:
determine queue levels of the one or more workgroup queues associated with the workgroups executing on the first processing core, wherein providing the queue elements from the one or more workgroup queues associated with workgroups executing on the first processing core to the first donation queue is based on the determined queue levels of the one or more workgroup queues associated with the workgroups executing on the first processing core;

determine queue levels of one or more workgroup queues associated with the workgroups executing on the second processing core; and provide the queue elements from the one or more workgroup queues associated with the workgroups executing on the second processing core to the second donation queue associated with the workgroups executing on the second processing core based on the determined queue levels of the one or more workgroup queues associated with the workgroups executing on the second processing core.

13. The electronic device of claim 7, wherein the processor module comprises:

a workgroup queue element dequeuer operative to dequeue queue elements from the one or more workgroup queues associated with workgroups executing on the first processing core;

a workgroup queue element queuer operative to queue elements to the one or more workgroup queues associated with workgroups executing on the first processing core;

a donation queue element queuer operative to queue elements to the first donation queue and to the second donation queue; and a donation queue element dequeuer operative to dequeue queue elements from the first donation queue and the second donation queue.

14. The electronic device of claim 7, wherein the processor comprises work stealing control logic operative to:

determine the queue level of the first donation queue; and determine the queue level of the second donation queue, wherein stealing the one or more queue elements from the second donation queue associated with the workgroups executing on the second processing core is based on the determined queue level of the first donation queue and the determined queue level of the second donation queue.

15. A non-transitory computer readable medium comprising executable instructions that when executed by one or more processors causes the one or more processors to:

provide queue elements from one or more workgroup queues associated with workgroups executing on a first processing core to a first donation queue associated with the workgroups executing on the first processing core atomically and within a device scope of the first processing core and the second processing core; and when a queue level of the first donation queue is below a first threshold, steal one or more queue elements from a second donation queue associated with workgroups executing on the second processing core to the first donation queue atomically and within the device scope of the first processing core and the second processing core.

16. The non-transitory computer readable medium of claim 15, wherein the one or more processors steal the one or more queue elements from the second donation queue associated with the workgroups executing on the second processing core when the queue level of the first donation queue is below the first threshold and a queue level of the second donation queue is below a second threshold.

17. The non-transitory computer readable medium of claim 15, wherein the one or more processors steal the one or more queue elements from the second donation queue associated with the workgroups executing on the second processing core when the queue level of the first donation queue is below the first threshold and a queue level of the one or more workgroup queues associated with workgroups executing on the first processing core is below a third threshold.

* * * * *